United States Patent

Sada et al.

[11] Patent Number: 6,060,866
[45] Date of Patent: May 9, 2000

[54] POWER CONTROL SYSTEM FOR VEHICLE AC GENERATOR

[75] Inventors: Takeshi Sada, Kariya; Toshinori Maruyama, Anjo; Tadashi Uematsu, Kariya, all of Japan

[73] Assignee: Denso Corporation, Kariya, Japan

[21] Appl. No.: 09/185,076

[22] Filed: Nov. 3, 1998

[30] Foreign Application Priority Data

Nov. 4, 1997 [JP] Japan ................................. 9-302118

[51] Int. Cl.[7] ............................................. H02P 9/30
[52] U.S. Cl. ................................. 322/59; 322/36
[58] Field of Search ........................... 322/27, 28, 29, 322/59, 36

[56] References Cited

U.S. PATENT DOCUMENTS

| 5,061,889 | 10/1991 | Iwatani et al. | 322/28 |
| 5,319,299 | 6/1994 | Maehara | 322/28 |
| 5,512,813 | 4/1996 | Uchinami | 322/28 |
| 5,719,485 | 2/1998 | Asada | 322/28 |
| 5,731,689 | 3/1998 | Sato | 322/25 |
| 5,754,030 | 5/1998 | Maehara et al. | 322/19 |
| 5,880,577 | 3/1999 | Aoyama et al. | 322/29 |
| 5,982,155 | 11/1999 | Rechdan et al. | 322/36 |

FOREIGN PATENT DOCUMENTS

| 57-106400 | 7/1982 | Japan . |
| 4-47548 | 8/1992 | Japan . |

Primary Examiner—Nicholas Ponomarenko
Attorney, Agent, or Firm—Pillsbury Madison & Sutro LLP

[57] ABSTRACT

In a power control system for a vehicle battery charging ac generator that has a switching element for turning on or off field current, the switching element is turned on at a first duty cycle less than a sum of a predetermined value and a value inversely proportional to rotation speed of the ac generator if the rotation speed is higher than a predetermined speed and at a second duty cycle more than 100% if the rotation speed is not higher than the predetermined speed.

6 Claims, 5 Drawing Sheets

POWER CONTROL SYSTEM FOR VEHICLE AC GENERATOR

CROSS REFERENCE TO RELATED APPLICATION

The present application is based on and claims priority from Japanese Patent Applications Hei 9-302118, filed on Nov. 4, 1997, the contents of which are incorporated herein by reference.

BACKGROUND OF THE INVENTION

1. Field of the Invention

The present invention relates to a power control system for a vehicle ac generator that controls output power at a high rotation speed.

2. Description of the Related Art

Recently, output power of a vehicle ac generator has increased and engine idling speed, which is the lowest generating speed of the ac generator, has been lowered. Increase in the output power of the ac generator at the lowest speed necessarily results in excessive output power at the highest speed of operation of the ac generator. This, in turn, increases amplitude of surge current and necessitates increasing the capacity of wire harnesses and an electric fuse of the vehicle.

JP-A 57-106400 proposes a field-current-duty-cycle control system for limiting the output power of an ac generator at a high rotation speed. In such a system, when the rotation speed becomes higher than a predetermined threshold level, width of a pulse signal is fixed and cycle time thereof changes in inverse proportion to the rotation speed to turn off a switching element of a regulator. Therefore, the turn-off period is fixed and the turn-on period (or duty cycle) is equal to the difference between the cycle time and the turn-off period.

Because the duty cycle is set as soon as the rotation speed becomes higher than the threshold level, the duty cycle is reduced abruptly. This reduces the output power of the generator abruptly, thereby giving shock to the generator.

JP-B2-4-47548 proposes a field-current control system, in which the field current is controlled so that the amplitude of surge current becomes lower than a breakdown voltage of a switching element even if the rotation speed of an ac generator becomes higher than a predetermined value. JP-A-3-49599 proposes a control system for limiting the maximum duty cycle. The control system has a specific field current source that supplies the field coil with current at a voltage higher than the output voltage of the generator and the switching element of a regulator with pulse signals so that the maximum duty cycle of the switching element can be controlled according to the rotation speed of the generator. In these two systems, triangular or saw tooth voltage signals are generated in proportion to the rotation speed, and the predetermined value is detected when the triangular voltage signal becomes higher than the predetermined voltage.

However, it is very difficult to provide an optimum characteristic curve for the maximum duty cycle to change in response to the rotation speed. In particular, if the predetermined voltage is higher than the peak voltage of the triangular voltage signal, the maximum duty cycle becomes zero. If the predetermined value is set lower than the bottom of the triangular voltage signal, the maximum duty cycle becomes 100%. This cause abrupt change of the duty cycle and gives shock to the generator.

SUMMARY OF THE INVENTION

The main object of the invention is to provide an improved control system for controlling the output power of an ac generator.

Another object of the invention is to provide a control system which prevents abrupt change of the duty cycle of the field current thereby preventing shock given to an ac generator.

According to a main aspect of the invention, the power control system includes a switching element for turning on or off current supplied to a field coil and means for operating the switching element at a first duty cycle less than a ratio inversely proportional to rotation speed of the ac generator if the rotation speed is higher than a predetermined speed and at a second duty cycle no less than 100% if the rotation speed is not higher than the predetermined speed.

The first duty cycle may be proportional to a sum of a predetermined value and a value inversely proportional to the rotation speed, or a ratio to control so that output power of the ac generator at a speed higher than the predetermined speed can be more than the normal output power at a speed lower than the predetermined speed and less than a value that is 10% more than the normal output power.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

A control circuit according to a first embodiment of the invention is described with reference to FIGS. 1–7.

Figure 1:
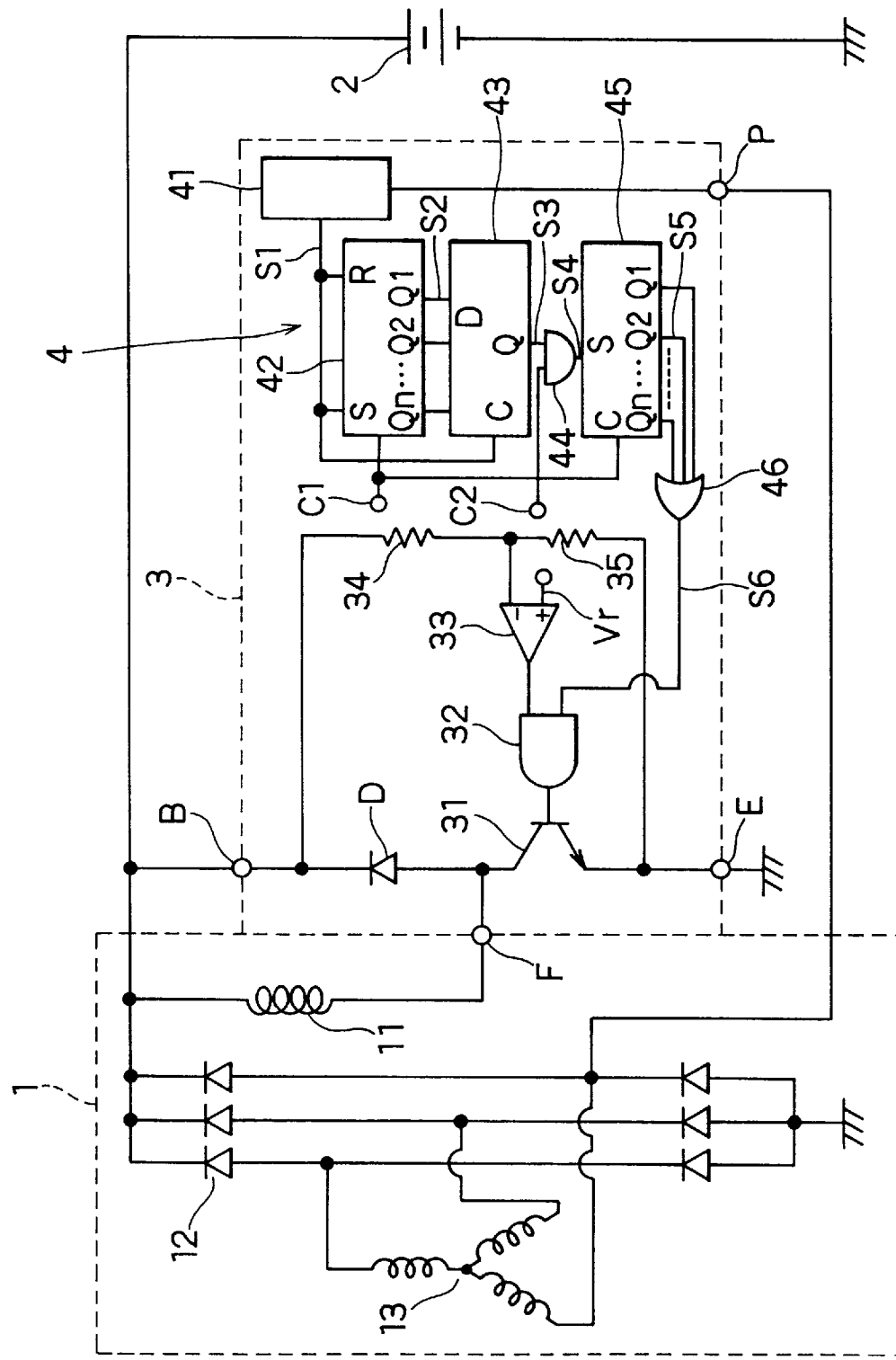
FIG. 1 is a block diagram of a control system for an ac generator a first embodiment of the invention.

In FIG. 1, ac generator 1 is connected to battery 2 and voltage regulator 3. AC generator 1 has field coil 11, rectifier unit 12, and armature coil 13. voltage regulator 3 is composed of switching element 31, AND gate 32, comparator 33, a voltage dividing circuit having resistors 34, 35 and maximum duty cycle setting circuit 4. Maximum-duty-cycle setting circuit 4 is composed of wave-shaping circuit 41, up-counter 42, latch circuit 43, down-counter 45, and OR gate 46.

In voltage regulator 3, battery voltage is divided by resistors 34, 45 to be compared with reference voltage Vr to turn switching element 31 on or off so that the battery voltage can be regulated. Maximum-duty-cycle setting circuit 4 limits the duty cycle of switching element 31 to a maximum value even when voltage regulator does not limit the same at a speed higher than normal speed.

Figure 2A:
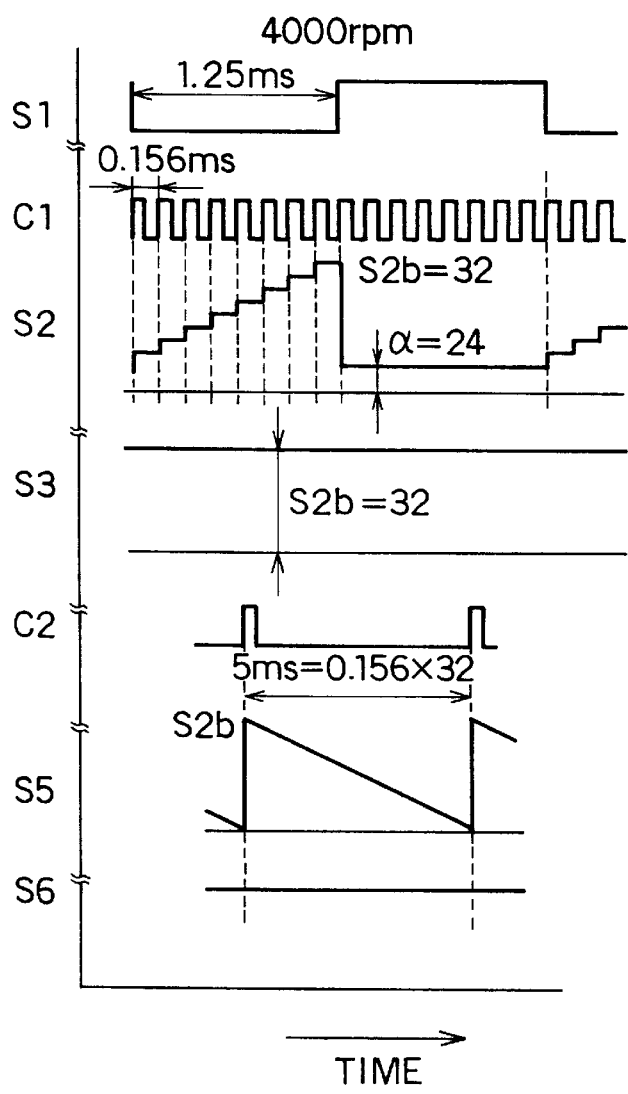
FIGS. 2A and 2B are timing charts showing voltage signals at various portions of the control system.
Figure 2B:
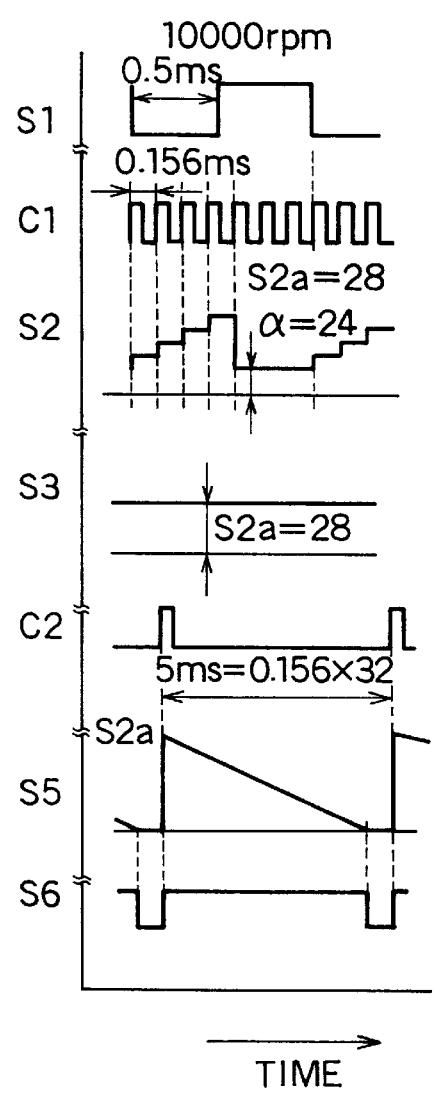

As shown in FIGS. 2A and 2B, wave-shaping circuit 41 of maximum-duty-cycle setting circuit 4 converts wave-shape P of one of the three phase-voltages of ac generator 1 into a rectangular signal or a pulse signal having high (H) and low (L) levels, which is provided on terminal S1. Clock pulses C1 having 0.156 ms cycle-time are supplied to both up-counter 43 and down-counter 45. If the rectangular signal becomes L level, up-counter 42 counts up clock pulses C1 from an initial value α and provides terminal S2 with a sum (e.g. 32) of the initial value (e.g. 24) and the counted number (e.g. 8). Then, latch 43 memorizes the number counted by up-counter 42 each cycle of the rectangular signal. When clock pulse C2 becomes H level, down-counter 45 starts to count down clock pulses C1 from the number memorized by latch 43. When down-counter 45 provides line S5 with 0 level, OR gate 46 changes the level of terminal S6 from H to L to close AND gate 32, thereby turning off switching element 31.

Thus, when the rotation speed of ac generator 1 is low (e.g. lower than 4000 rpm) and the cycle time of the rectangular signal is long, the number memorized by latch 43 becomes so large that the number of down-counter 45 can not become 0 before clock pulse C2 becomes H level to reset down-counter 45 to start counting again from the number memorized by latch 43. Accordingly, switching element 31 is not turned off by OR gate 46.

When the rotation speed of an ac generator 1 having 12 poles becomes a normal level such as 4,000 rpm where a half of the cycle time is 1.25 ms (as shown in FIG. 2), clock pulse C2 becomes H level as soon as down-counter 45 provides terminal S5 with 0 level signal so that OR gate 46 provides switching element 31 with 100% duty cycle. That is, switching element 31 always supplies the field current to field coil 13.

On the other hand, when the rotation speed becomes higher than the normal level such as 10,000 rpm where a half of the cycle time is 0.5 ms (as shown in FIG. 2B), clock pulse C2 becomes H level a certain time after down-counter 45 provides terminal S5 with 0 level signal. Consequently, OR gate 46 provides terminal S6 with the L level signal. Accordingly, switching element 31 is turned off as long as the number of the down-counter remains 0. That is, OR gate 46 provides switching element 31 with a duty cycle less than 100%.

Thus, the maximum duty cycle decreases as the rotation speed becomes higher than the normal level. In other words, the maximum duty cycle changes in inverse proportion to the rotation speed in the speed range higher than the normal level.

Preferably, ac generator 1 is controlled so that the output power at a speed higher than a normal or predetermined rotation speed can be controlled higher than normal output power generated at the normal rotation speed and lower than a level that is 10% higher than the normal output power.

Figure 3:
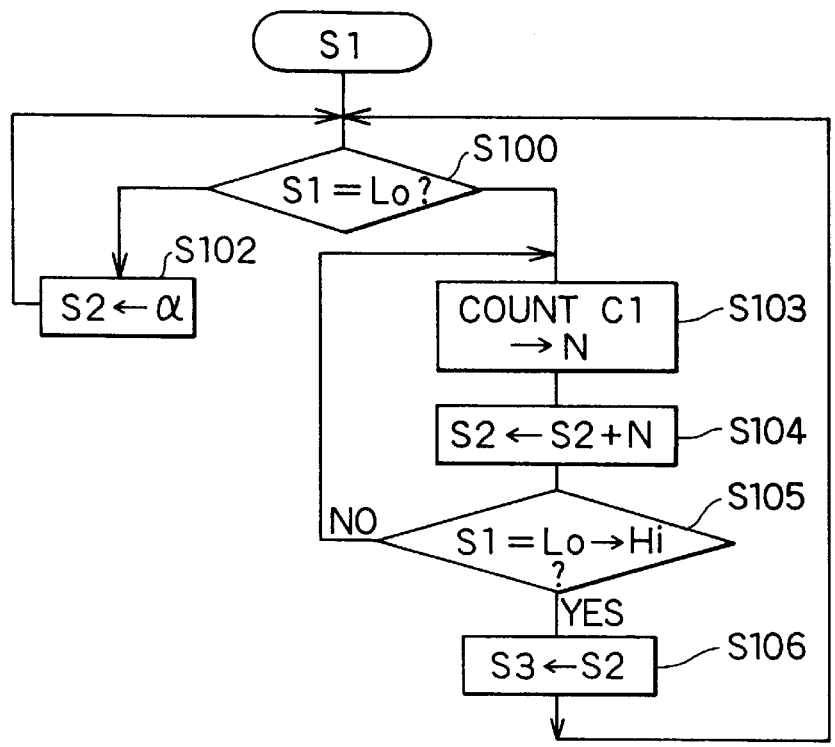
FIG. 3 is a flow chart of controlling steps executed in a maximum-duty-cycle setting circuit of the control circuit.
Figure 4:
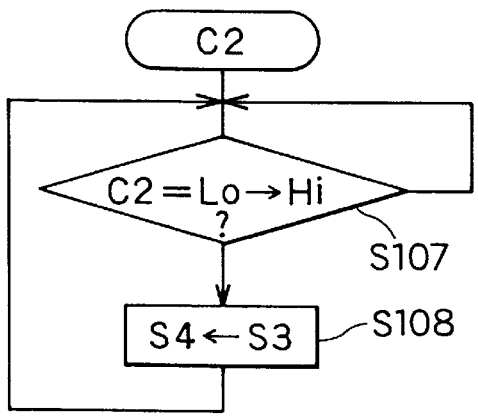
FIG. 4 is another flow chart of controlling steps executed in the maximum-duty-cycle setting circuit.
Figure 5:
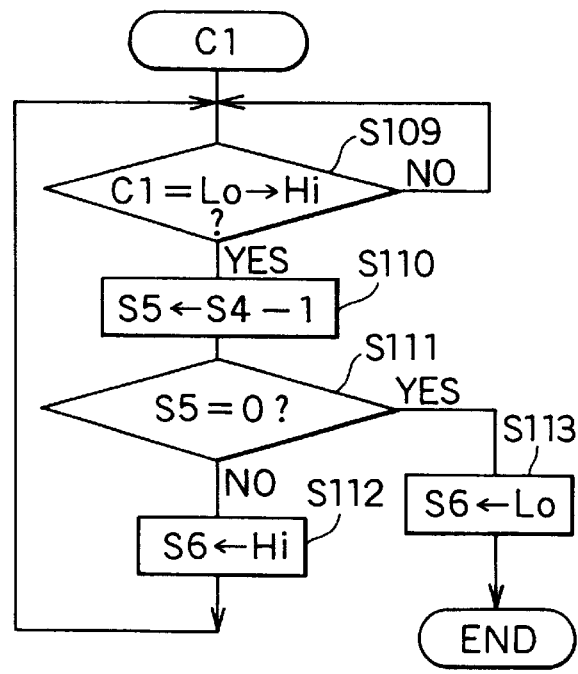
FIG. 5 is another flow chart of controlling steps executed in the maximum-duty-cycle setting circuit.

Operation of maximum-duty-cycle setting circuit 4 is described in more detail with reference to flow charts shown in FIGS. 3–5. The level of terminal S1 is always detected. If the level is found Lo in step S100, initial value α is given to terminal S2 of up-counter 42 in step S102. Concurrently, up-counter 42 counts up clock pulse C1 in step S103 and initial value is added to a counted number N in step S104. These steps are continued until the level of terminal S1 of wave shaping circuit 41 changes from Lo to Hi in step S105. If the level of terminal S1 changes to Hi from Lo in step S105, the value given to terminal S2 of up-counter 42 is transmitted to terminal S3 of latch circuit s3 in step S106. Thereafter, step S100 is executed again.

The level of clock pulse C2 is always detected, and if the level changes Lo to Hi in step S107, the value transmitted to S3 is transmitted to terminal S4 of down-counter 45 in step S108, and these steps are repeated.

Then, down-counter counts down as clock pulse C1 changes Lo to Hi in steps S109–S112 until the level of terminal S5 is found 0 in step S111 and terminal S6 of OR gate 46 becomes Lo in step S113.

Figure 6:
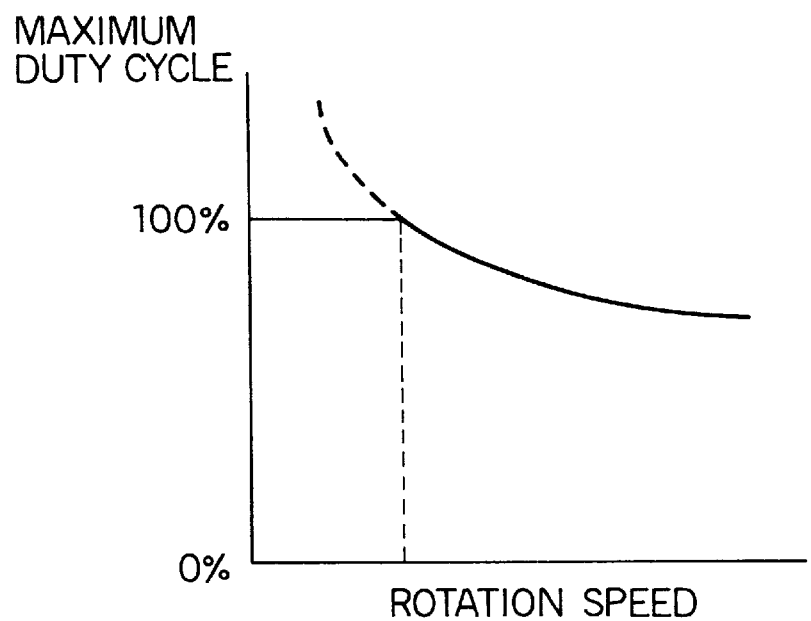
FIG. 6 is a graph of characteristic curves showing relationship between the maximum duty cycle of the field current and rotation speed of the ac generator.
Figure 7:
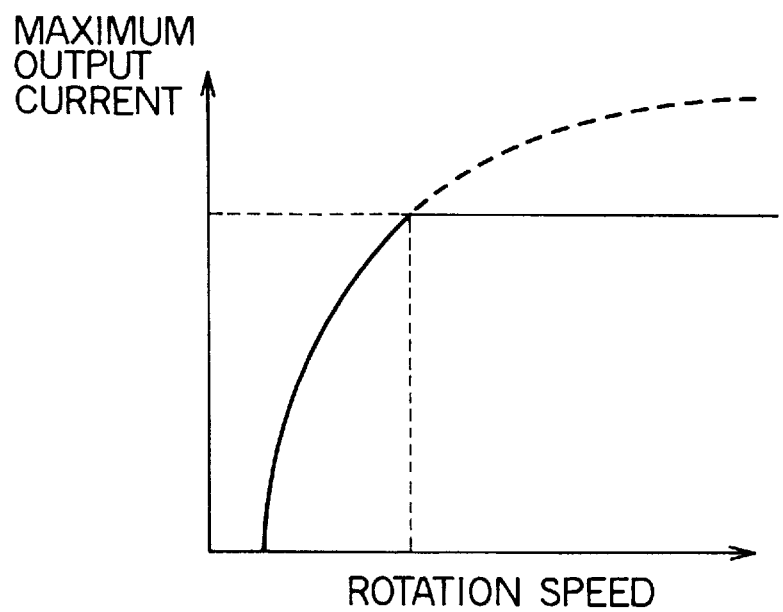
FIG. 7 is a graph of a characteristic curve showing relationship between maximum output current of the ac generator and the rotation speed thereof.

As shown in FIG. 6, the maximum duty cycle of the field current shown by a solid line changes in inverse proportion to the rotation speed. Thus, the output current of the ac generator 1 can be regulated to be constant in the speed range higher than a normal speed as shown in FIG. 7.

Second Embodiment

Figure 8:
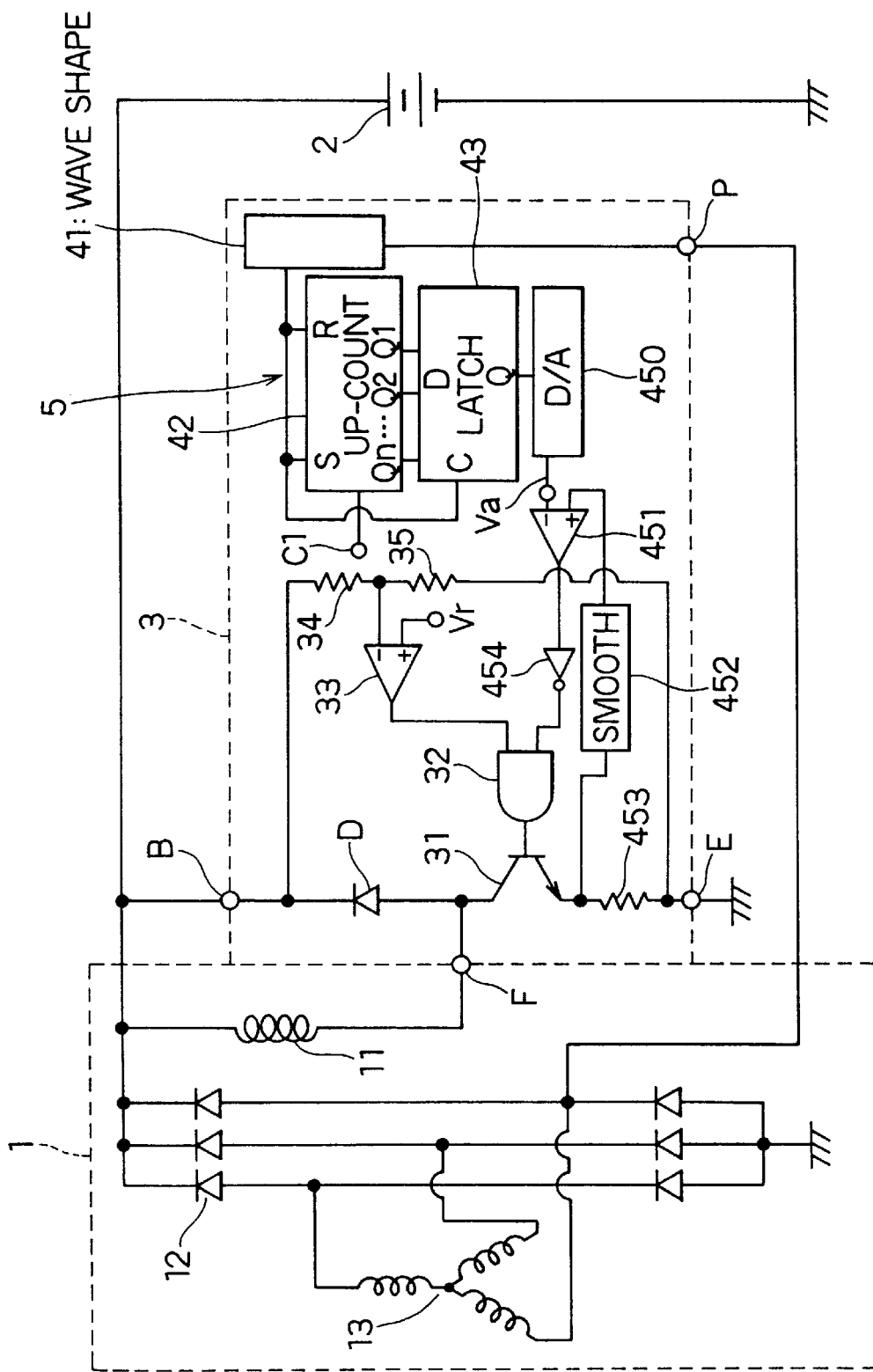
FIG. 8 is a block diagram of a control circuit according to a second embodiment of the invention.

A control system according to a second embodiment of the invention is described with reference to FIG. 8.

Maximum-duty-cycle setting circuit 5 is composed of wave shaping circuit 41, up-counter 42, latch circuit 43, D/A converter 450, comparator 451, smoothing circuit 452, field current detection resistor 453 and inverter 454.

The digital value memorized by latch circuit 43 is converted into analog voltage Va by D/A converter 44. Resistor 453 is connected between transistor (switching element) 31 and a ground E. A quantity of field current is converted into a voltage by resistor 453, which is smoothed by smoothing circuit 452 and applied to comparator 451 to be compared with analog voltage Va. If the voltage related to the field current is higher than analog voltage Va, comparator 45 provides an OFF signal to turn off transistor 31 through inverter 454 and AND gate 32.

Thus, the field current is controlled to correspond to a sum of a value in inverse proportion to the rotation speed of the ac generator and a certain constant, so that the output of the generator can be regulated in substantially the same manner as the first embodiment.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A power control system for a vehicle battery charging ac generator having a field coil and a rectifier unit, said power control system comprising:

a switching element for turning on or off current supplied to said field coil; and means for controlling said switching element to turn on at a first duty cycle less than a ratio inversely proportional to rotation speed of said ac generator when said rotation speed is higher than a predetermined speed and at a second duty cycle more than 100% when said rotation speed is not higher than said predetermined speed.

2. The power control system as claimed in claim 1, wherein said first duty cycle is proportional to a sum of a predetermined value and a value inversely proportional to said rotation speed.

3. The power control system as claimed in claim 2, wherein said first duty cycle is a ratio to control so that output power of said ac generator at a speed higher than said predetermined speed is more than normal output power at a speed lower than said predetermined speed and less than a value that is 10% more than said normal power.

4. The power control system as claimed in claim 1, wherein said means comprises: a first pulse generator for generating first pulses at a fixed cycle time; a counter for counting said first pulses in a period inversely proportional to said rotation speed; an adder for providing a sum of the number of said first pulses counted by said first counter and a predetermined value; a latch circuit for memorizing said sum; and a maximum duty-cycle-setting circuit for providing a ratio proportional to said sum.

5. The power control system as claimed in claim 1, wherein said duty-cycle-setting circuit comprises:

a field current detecting circuit for providing a value proportional to said current supplied to said field coil; and a comparator circuit for turning off said switching element when said value is larger than said ratio.

6. The power control system as claimed in claim 1 further comprising a voltage regulator commonly having said switching element, wherein said means turns off said switching element regardless of said voltage regulator when said rotation speed is higher than said predetermined speed.

\* \* \* \* \*